United States Patent
Kagawa et al.

(10) Patent No.: US 10,283,284 B2
(45) Date of Patent: May 7, 2019

(54) METHOD AND APPARATUS FOR PRODUCING MICROPOROUS METAL FOIL

(71) Applicant: Seiji Kagawa, Koshigaya-shi, Saitama (JP)

(72) Inventors: Seiji Kagawa, Koshigaya (JP); Yoichiro Kagawa, Koshigaya (JP)

(73) Assignee: SEIJI Kagawa, Koshigaya-Shi (JP)

( * ) Notice: Subject to any disclaimer, the term of this patent is extended or adjusted under 35 U.S.C. 154(b) by 119 days.

(21) Appl. No.: 15/128,327

(22) PCT Filed: Mar. 5, 2015

(86) PCT No.: PCT/JP2015/056492
§ 371 (c)(1),
(2) Date: Sep. 22, 2016

(87) PCT Pub. No.: WO2015/156060
PCT Pub. Date: Oct. 15, 2015

(65) Prior Publication Data
US 2017/0103857 A1    Apr. 13, 2017

(30) Foreign Application Priority Data

Apr. 10, 2014 (JP) .................. 2014-081409
Oct. 22, 2014 (JP) .................. 2014-215334

(51) Int. Cl.
*H01G 11/84* (2013.01)
*H01G 11/70* (2013.01)
(Continued)

(52) U.S. Cl.
CPC .............. *H01G 11/84* (2013.01); *B26F 1/20* (2013.01); *H01G 11/68* (2013.01); *H01G 11/70* (2013.01);
(Continued)

(58) Field of Classification Search
CPC ........ H01G 11/84; H01G 11/68; H01G 11/70; H01G 11/28; B26F 1/20; H01M 4/661;
(Continued)

(56) References Cited

U.S. PATENT DOCUMENTS 5,648,107 A * 7/1997 Kagawa .................. B26F 1/24
264/284
9,889,479 B2 * 2/2018 Kagawa .................. B21B 1/40
(Continued)

FOREIGN PATENT DOCUMENTS

GB       1163453       9/1969
GB       2 043 426 A   10/1980
(Continued)

OTHER PUBLICATIONS

Kumabe, J., Precision Machining Vibration Cutting—Fundamentals and Applications—, Japan Jikko Shuppan Co. (Sep. 27, 1980), pp. 16-20.
(Continued)

*Primary Examiner* — John C Hong
(74) *Attorney, Agent, or Firm* — Birch, Stewart, Kolasch & Birch, LLP (57) ABSTRACT

A method and an apparatus for producing a microporous metal foil by forming fine pores in a metal foil passing through a gap between a pattern roll having high-hardness fine particles on the surface and a hard metal roll; (a) a plastic sheet laminate comprising a soft plastic layer and a hard plastic layer having high tensile strength being interposed between the metal foil and the hard metal roll, with the soft plastic layer on the metal foil side; and (b) mechanical vibration being given to at least one of the pattern roll and the hard metal roll.

12 Claims, 7 Drawing Sheets

(51) Int. Cl.
    *H01M 4/66*      (2006.01)
    *H01M 4/80*      (2006.01)
    *H01M 10/0525*      (2010.01)
    *H01G 11/68*      (2013.01)
    *B26F 1/20*      (2006.01)
    *H01G 11/28*      (2013.01)
    *B29C 59/04*      (2006.01)

(52) U.S. Cl.
    CPC ............ *H01M 4/661* (2013.01); *H01M 4/80* (2013.01); *H01M 10/0525* (2013.01); *B29C 59/04* (2013.01); *H01G 11/28* (2013.01); *Y02E 60/13* (2013.01)

(58) Field of Classification Search
    CPC ..... H01M 10/0525; H01M 4/80; B29C 59/04; Y02E 60/13
    See application file for complete search history.

(56) References Cited

U.S. PATENT DOCUMENTS

2012/0219817 A1    8/2012   Konishi et al.
2012/0264022 A1   10/2012   Hosoe et al.

FOREIGN PATENT DOCUMENTS

| | | |
|---|---|---|
| JP | 62-203800 A | 9/1987 |
| JP | 7-164535 A | 6/1995 |
| JP | 2001-79795 A | 3/2001 |
| JP | 2001-287196 A | 10/2001 |
| JP | 2002-59487 A | 2/2002 |
| JP | 2002-216775 A | 8/2002 |
| JP | 2011-74468 A | 4/2011 |
| JP | 2011-165637 A | 8/2011 |
| JP | 2012-186142 A | 9/2012 |

OTHER PUBLICATIONS

Notice of Reasons for Rejection dated Dec. 6, 2016, in Japanese Patent Application No. 2016-512632, (English translation).
International Search Report issued in PCT/JP2015/056492, dated Apr. 14, 2015.
Written Opinion of the International Searching Authoriy issued in PCT/JP2015/056492 (PCT/ISA/237), dated Apr. 14, 2015.
Extended European Search Report dated Nov. 2, 2017, in European Patent Application No. 15777244.3.

* cited by examiner

METHOD AND APPARATUS FOR PRODUCING MICROPOROUS METAL FOIL

FIELD OF THE INVENTION

The present invention relates to a method and an and apparatus for efficiently producing a microporous metal foil such as a microporous aluminum foil, etc., suitable for current collectors in lithium ion batteries, lithium ion capacitors, electric double-layer capacitors, etc.

BACKGROUND OF THE INVENTION

To provide lithium ion batteries, lithium ion capacitors, electric double-layer capacitors, etc. with increased energy densities, current collectors preferably have penetrating pores to reduce positive electrode potential. Aluminum foils are widely used for current collectors, and penetrating pores are formed by various methods.

For example, JP 2011-74468 A discloses a method for producing a high-strength aluminum foil having penetrating pores by simultaneously drawing and bending an aluminum foil having large numbers of penetrating pores. The penetrating pores having inner diameters of 0.2-5 μm are formed by subjecting the aluminum foil to DC etching in an electrolyte solution comprising hydrochloric acid as a main component to form etched pits, and adjusting the diameters of the etched pits by chemical etching. However, because the etched pits have small inner diameters, a sufficient amount of an active material does not enter the penetrating pores, failing to obtain a sufficiently high energy density. In addition, because the formation of penetrating pores by etching has low productivity, it is not suitable for inexpensively producing a microporous metal foil.

JP 2011-165637 A discloses a method for producing a positive current collector, which is provided with a positive active material layer to form a positive electrode of a lithium ion battery, the positive current collector being constituted by an aluminum alloy foil provided with pluralities of pit-like pores on the surface on which the positive active material layer is to be formed, the pores having an average pore size of 1.0-5 μm, and a ratio of average pore size/average pore depth being 1.0 or less, the method comprising the steps of subjecting the aluminum alloy foil to DC electrolytic etching, and treating the etched aluminum alloy foil with an aqueous organic phosphoric acid solution. However, because pit-like pores formed by DC electrolytic etching have as small an average pore size as 5 μm or less, a sufficient amount of an active material does not enter the pit-like pores. In addition, it is not suitable for inexpensively producing a microporous metal foil, because of low productivity in the formation of penetrating pores by etching, like JP 2011-74468 A.

JP 2012-186142 A discloses a method for producing an electrode for electrochemical devices, which is formed by laminating pluralities of porous aluminum sheets filled with an active material, comprising the steps of filling each porous aluminum sheet with the active material, compressing it to provide a thin, porous aluminum sheet, and then laminating pluralities of active-material-filled, thin, porous aluminum sheets. The porous aluminum sheet is produced, for example, by forming a eutectic alloy coating at a temperature equal to or lower than the melting point of Al on a foamed resin having a three-dimensional network structure by plating, vapor deposition, sputtering, CVD, etc., impregnating the foamed resin with a paste comprising Al powder, a binder and an organic solvent as main components, and then heat-treating it in a non-oxidizing atmosphere at a temperature of 550-750° C.

However, this porous aluminum sheet is disadvantageous not only in a complicated production method, but also in poor mechanical strength because of the three-dimensional network structure. Further, it is not suitable for inexpensively producing a microporous metal foil because of low productivity.

Desired in view of the above circumstances are a method and an apparatus for inexpensively producing a microporous metal foil such as a microporous aluminum foil, etc. having sufficient fine pores to hold an active material, as well as high mechanical strength, which is suitably usable in lithium ion batteries, lithium ion capacitors, electric double-layer capacitors, etc.

OBJECT OF THE INVENTION

Accordingly, an object of the present invention is to provide a method and an apparatus for inexpensively and efficiently producing a microporous metal foil having sufficient fine pores for holding an active material, as well as high mechanical strength.

DISCLOSURE OF THE INVENTION

As a result of intensive research in view of the above object, the inventor has found that when a metal foil passes through a gap between a pattern roll having high-hardness fine particles on the surface and an opposing hard metal roll under pressure, to form large numbers of fine pores, (a) the interposition of a plastic sheet laminate comprising a soft plastic layer and a hard plastic layer having high tensile strength between both rolls with the soft plastic layer on the metal foil side drastically improves the pore-forming ratio of a metal foil, and (b) vibration given to both rolls further improves the pore-forming ratio of a metal foil even with the same pattern roll, with most of burrs detached from the metal foil during the formation of pores held by the plastic sheet without scattering. The present invention has been completed based on such finding.

Thus, the method of the present invention for producing a microporous metal foil comprises forming fine pores in a metal foil passing through a gap between a pattern roll having high-hardness fine particles on the surface and a hard metal roll;
(a) a plastic sheet laminate comprising a soft plastic layer and a hard plastic layer having high tensile strength being interposed between the metal foil and the hard metal roll, with the soft plastic layer on the metal foil side; and
(b) mechanical vibration being given to at least one of the pattern roll and the hard metal roll.

The apparatus of the present invention for producing a microporous metal foil comprises
a pore-forming apparatus comprising a pattern roll having large numbers of high-hardness fine particles on the surface, and a hard roll opposing the pattern roll with a gap;
a first guide means for passing a metal foil through a gap between the pattern roll and the hard roll;
a second guide means for passing a plastic sheet laminate comprising a soft plastic layer and a hard plastic layer having high tensile strength, through a gap between the metal foil and the hard roll; and a vibration means for giving mechanical vibration to at least one of the pattern roll and the hard metal roll;

the metal foil and the plastic sheet laminate being overlapped such that the metal foil, the soft plastic layer and the hard plastic layer are arranged in this order from the pattern roll side, and passing through a gap between the pattern roll and the hard roll under mechanical vibration, thereby forming fine penetrating pores in the metal foil.

The pushing force of the pattern roll to the metal foil is preferably 50-600 kgf/cm by linear pressure.

The mechanical vibration preferably has a component perpendicular to the metal foil. The mechanical vibration is preferably given by a vibration motor mounted to each bearing of the pattern roll or the hard metal roll. With the mechanical vibration, both of the pattern roll and the hard metal roll are vibrated vertically (in a direction perpendicular to the roll gap). The frequency of the mechanical vibration is preferably 500-2000 Hz.

The pattern roll preferably has high-hardness fine particles having sharp edges and Mohs hardness of 5 or more on the surface. The high-hardness fine particles preferably have particle sizes in a range of 50-500 μm. The fine particles are preferably attached to a roll surface at an area ratio of 30-80%.

EFFECTS OF THE INVENTION

In the present invention, in the formation of fine pores in a metal foil passing through a gap between a pattern roll having high-hardness fine particles on the surface and a hard metal roll, a plastic sheet laminate comprising a soft plastic layer and a hard plastic layer having high tensile strength is interposed between the metal foil and the hard metal roll, with the soft plastic layer on the metal foil side; and mechanical vibration is given to at least one of the pattern roll and the hard metal roll. Accordingly, (a) fine penetrating pores can be formed in the metal foil at high density, and (b) most of detached fine metal foil burrs generated by the formation of fine penetrating pores can be trapped by the plastic sheet. Thus, a metal foil provided with fine penetrating pores at high density can be produced inexpensively and efficiently. Microporous metal foils produced by the present invention are suitable for current collectors, etc. used in lithium ion batteries, lithium ion capacitors, electric double-layer capacitors, etc.

DESCRIPTION OF THE PREFERRED EMBODIMENTS

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] Production Apparatus

Figure 1:
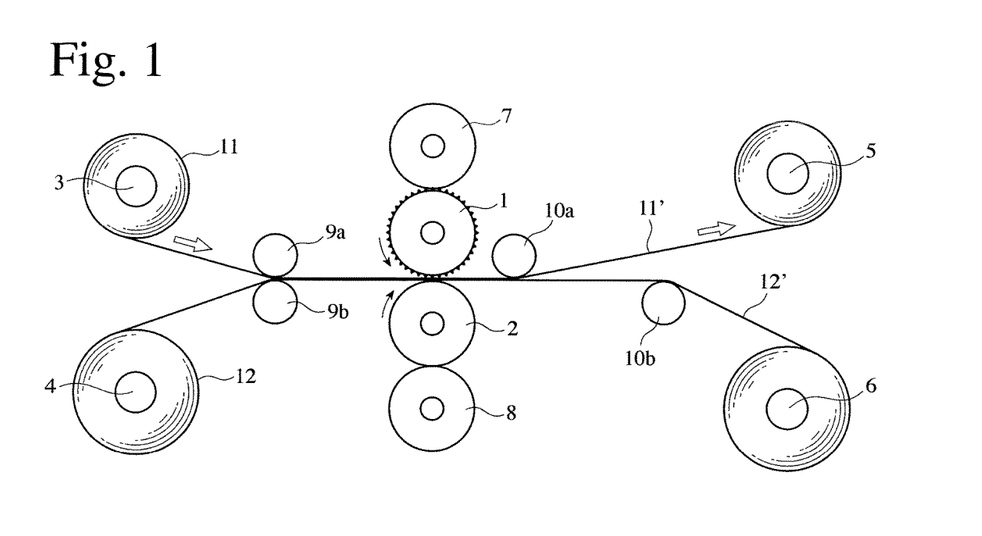
FIG. 1 is a schematic view showing the production apparatus of the present invention.

The microporous metal foil is preferably produced by an apparatus comprising a pore-forming apparatus as shown, for example, in FIG. 1. This apparatus comprises a pattern roll 1, a hard metal roll 2, first to fourth reels 3-6, backup rolls 7, 8 for the pattern roll 1 and the hard metal roll 2, and guide rolls 9a, 9b, 10a, 10b. A ribbon-shaped metal foil 11 wound off from the first reel 3 and a ribbon-shaped plastic sheet laminate 12 wound off from the second reel 4 are overlapped through a pair of guide rolls 9a, 9b upstream of the pattern roll 1, and pass through a gap between the pattern roll 1 and the hard metal roll 2. The resultant microporous metal foil 11' is wound around the third reel 5, and the used plastic sheet laminate 12' is wound around the fourth reel 6. The metal foil 11 is arranged on the side of the pattern roll 1, and the plastic sheet laminate 12 is arranged on the side of the hard metal roll 2. With the backup rolls 7, 8, the pattern roll 1 uniformly applies a sufficient pushing force to the metal foil 11. The resultant microporous metal foil 11' is peeled from the used plastic sheet laminate 12' by the guide roll 10a downstream of the pattern roll 1, and the guide roll 10b applies tension to the used plastic sheet laminate 12' to be wound around the fourth reel 6.

In the production apparatus shown in FIG. 1, the first reel 3, a pair of guide rolls 9a, 9b, and the guide roll 10a used for supplying the untreated metal foil 11 constitute the first guide means as a whole. Of course, the first guide means is not restricted to this constitution, but any guide means effective for passing the metal foil 11 through a gap between the pattern roll 1 and the hard metal roll 2 may be included. Also, the second reel 4, a pair of guide rolls 9a, 9b, and the guide roll 10b used for supplying the plastic sheet laminate 12 constitute the second guide means as a whole. Of course, the second guide means is not restricted to this constitution, but any guide means effective for passing the plastic sheet laminate 12 through a gap between the pattern roll 1 and the hard metal roll 2 may be included.

An adjusting means (not shown) for providing substantially equal tension to the metal foil 11 and the plastic sheet laminate 12 is preferably added. The tension-adjusting means is usually obtained by combining pluralities of movable guide rolls for each of the metal foil 11 and the plastic sheet laminate 12. By controlling the positions of one or more of guide rolls, tension applied to each of the metal foil 11 and the plastic sheet laminate 12 can be changed, thereby keeping optimum tension for them.

Figure 2:
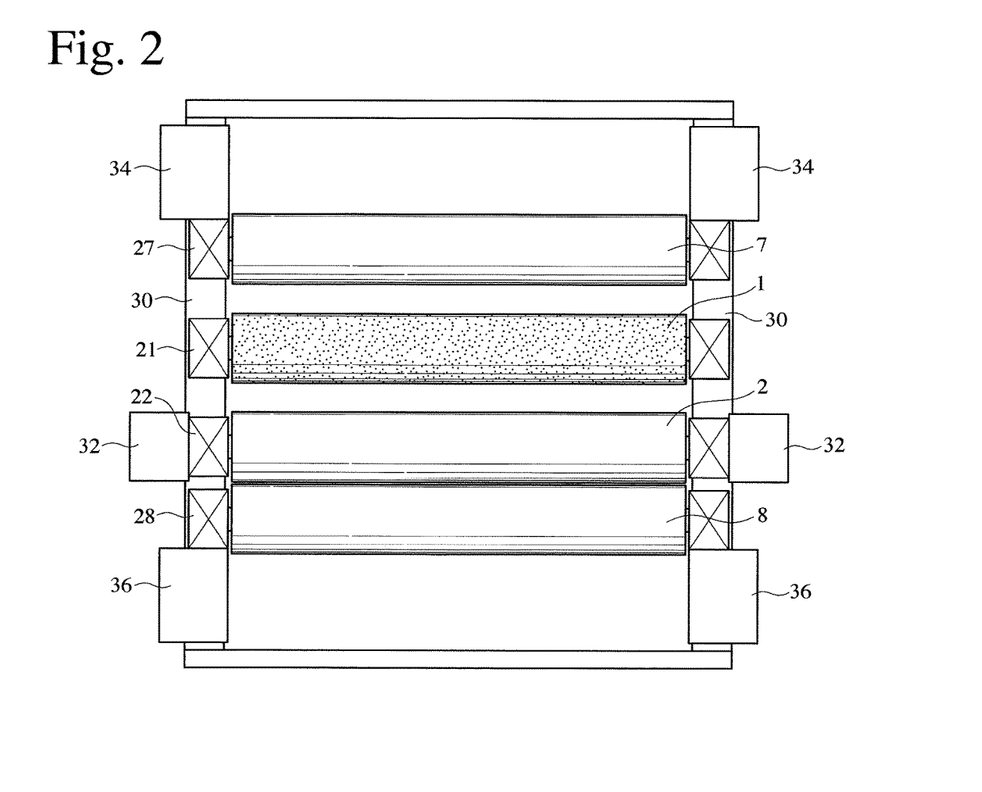
FIG. 2 is a front view showing a pore-forming apparatus in the apparatus of FIG. 1.

In the pore-forming apparatus shown in FIG. 2, a backup roll 7, a pattern roll 1, a hard metal roll 2 and a backup roll 8 are rotatably supported in this order from above by a pair of frames 30, 30 via bearings 27, 21, 22, 28. The backup rolls 7, 8 may be rubber rolls. In the depicted example, both pattern roll 1 and hard metal roll 2 are driving rolls, and vibration motors 32, 32 are mounted to both bearings 22, 22 of the hard metal roll 2. The bearings 21, 21 of the pattern roll 1 are fixed to the frames 30, 30, and the bearings 27, 27, 28, 28, 22, 22 of the upper and lower backup rolls. 7, 8 and the hard metal roll 2 are movable along a pair of frames 30, 30. Both bearings 27, 27 of the upper backup roll 7 engage the driving means 34, 34, and both bearings 28, 28 of the lower backup roll 8 engage the driving means 36, 36. The upper backup roll 7 pushes the pattern roll 1 downward, and the lower backup roll 8 pushes the hard metal roll 2 upward. The hard metal roll 2 is pushed by the backup roll 8 to the pattern roll 1 via the plastic sheet laminate 12 and the metal foil 11. This means that the pattern roll 1 is pushed to the hard metal roll 2 via the metal foil 11 and the plastic sheet laminate 12. Because the pattern roll 1 and the hard metal roll 2 are pushed by the backup rolls 7, 8, their elastic deformation during the formation of pores can be prevented.

(1) Pattern Roll

Figure 3:
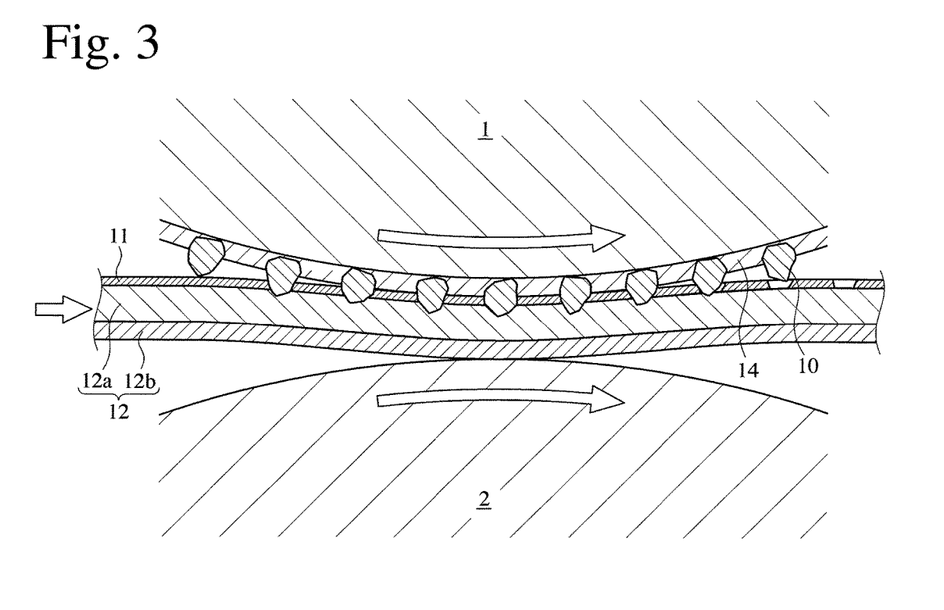
FIG. 3 is a partial enlarged cross-sectional view showing a metal foil passing between a pattern roll and a hard metal roll together with a plastic sheet laminate to form penetrating pores in the metal foil by high-hardness fine particles on the pattern roll.

As shown in FIG. 3 in detail, the pattern roll 1 is preferably a hard metal roll having high-hardness fine particles 10 having sharp edges and Mohs hardness of 5 or more at random on the surface, for example, a diamond roll described in JP 2002-59487 A. High-hardness fine particles 10 of diamond, etc. have particle sizes of preferably 50-500 μm, more preferably 100-400 μm. The area ratio of high-hardness fine particles 10 of the pattern roll 1 (ratio of high-hardness fine particles 10 occupying the roll surface) is preferably 30-80%, more preferably 50-80%. High-hardness fine particles 10 are fixed to the roll body by a nickel plating layer 14, etc.

To prevent the deflection of the pattern roll 1 during the formation of pores in the metal foil 11, a roll body of the pattern roll 1 is preferably made of a hard metal. The hard metal may be die steel such as SKD11.

(2) Hard Metal Roll

The hard metal roll 2 opposing the pattern roll 1 is also preferably made of a hard metal such as die steel, to prevent deflection during the formation of pores.

[2] Production Method (1) Plastic Sheet Laminate

The plastic sheet laminate 12 is constituted by a soft plastic layer 12a which has such softness as to allow high-hardness fine particles 10 penetrating the metal foil 11 to intrude easily, and a hard plastic layer 12b having high tensile strength. When the metal foil 11 and the plastic sheet laminate 12 pass through a gap between the pattern roll 1 and the hard metal roll 2, with the soft plastic layer 12a on the side of the metal foil 11, high-hardness fine particles 10 penetrating the metal foil 11 can sufficiently intrude into the soft plastic layer 12a, while the plastic sheet laminate 12 is not extended because of the hard plastic layer 12b even under large tension during the formation of pores in the metal foil 11.

The soft plastics may be thermoplastic flexible polymers such as polyolefins, soft polyvinyl chloride, etc. Polyolefins may be low-density polyethylene (LDPE), linear low-density polyethylene (LLDPE), unoriented polypropylene (CPP), ethylene-vinyl acetate copolymer (EVAc), etc. The hard plastics having high tensile strength may be thermoplastic flexible polymers, such as polyesters such as polyethylene terephthalate (PET), etc., polyamides such as nylons (Ny), etc., oriented polypropylene (OPP), etc.

The soft plastic layer 12a preferably has a thickness of 20-300 μm. When the thickness of the soft plastic layer 12a is less than 20 μm, large high-hardness fine particles 10 among those on the pattern roll 1 penetrate the soft plastic layer 12a to reach the hard plastic layer 12b, resulting in a low pore-forming ratio of the metal foil 11. On the other hand, when the thickness of the soft plastic layer 12a is more than 300 μm, it meaninglessly exceeds the intrusion depth of the high-hardness fine particles 10. The thickness of the soft plastic layer 12a is more preferably 30-150 μm, most preferably 30-100 μm.

The hard plastic layer 12b need only be thick enough to give sufficient tensile strength to the plastic sheet laminate 12, though variable depending on the type of a hard plastic. Specifically, the thickness of the hard plastic layer 12b may be about 10-30 μm. The soft plastic layer 12a and the hard plastic layer 12b may be adhered with an adhesive as thick as about 5-30 μm, or heat-laminated.

(2) Metal Foil

The metal foil 11 to be made porous is preferably an aluminum foil, a copper foil or a stainless steel foil. Particularly, the aluminum foil can be used for current collectors of lithium ion batteries, lithium ion capacitors, electric double-layer capacitors, etc., and the copper foil can be used for anodes or cathodes of energy storage devices such as lithium ion batteries, lithium ion capacitors, etc. The method of the present invention can be used for forming pores in a metal foil 11 having a thickness of about 5-50 μm. To obtain a microporous metal foil 11 suitably usable for current collectors, etc. of lithium ion batteries, pores can be formed in a metal foil 11 having a thickness of preferably 30 μm or less, more preferably 25 μm or less.

(3) Pore-forming Method

Figure 4:
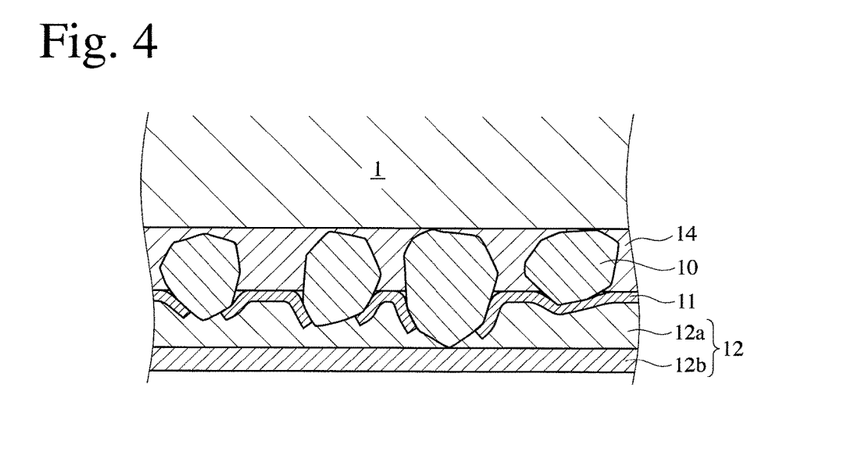
FIG. 4 is a partial enlarged cross-sectional view showing in detail the intrusion of metal foil burrs into a soft plastic layer by high-hardness fine particles penetrating the metal foil, between the pattern roll and the hard metal roll.

As shown in FIG. 1, the metal foil 11 overlapped with the plastic sheet laminate 12 is caused to pass through a gap between the pattern roll 1 and the hard metal roll 2, with the plastic sheet laminate 12 on the side of the hard metal roll 2, and the soft plastic layer 12a on the side of the metal foil 11, so that high-hardness fine particles 10 on the pattern roll 1 pushing the metal foil 11 penetrate the metal foil 11 and intrude into the soft plastic layer 12a in the plastic sheet laminate 12. FIG. 4 shows the formation of penetrating pores (including unpenetrating pores) having various sizes in the metal foil 11 by high-hardness fine particles 10 having various sizes and fixed to the pattern roll 1. Even though high-hardness fine particles 10 project with different heights from the nickel plating layer 14 on the pattern roll 1, high-hardness fine particles 10 penetrating the metal foil 11 sufficiently intrude into the soft plastic layer 12a, because the soft plastic layer 12a is as thick as permitting the sufficient intrusion of high-hardness fine particles 10. When the high-hardness fine particles 10 penetrate the metal foil 11, the metal foil 11 is complicatedly cut and bent along the high-hardness fine particles 10, intruding into the soft plastic layer 12a together with the high-hardness fine particles 10. Because the soft plastic layer 12a is sufficiently soft, the metal foil 11 is bent only in portions into which high-hardness fine particles 10 penetrate, and intrudes into the soft plastic layer 12a.

To form large numbers of penetrating pores in the metal foil 11, the pushing force of the pattern roll 1 is preferably 50-600 kgf/cm by linear pressure. The pushing force is a value obtained by dividing a load applied to both shafts of the pattern roll 1 by the width of the metal foil 11. For example, when pores are formed in a 30-cm-wide metal foil 11 under a load of 3 tons+3 tons onto both shafts of the pattern roll 1, a pushing force is (3000+3000)/30=200 kgf/cm. When the pushing force of the pattern roll 1 is less than 50 kgf/cm, sufficient numbers of penetrating pores are not formed. On the other hand, when the pushing force of the pattern roll 1 is more than 600 kgf/cm, the metal foil 11 may be broken. More preferably, the pushing force is 100-400 kgf/cm.

Because the soft plastic layer 12$a$ of the plastic sheet laminate 12 has sufficiently large compression resistance, it is not deformed by compression, when high-hardness fine particles 10 penetrating the metal foil 11 intrude under the above pushing force. Accordingly, high-hardness fine particles 10 can form raggedness-free penetrating pores in the metal foil 11, without wrinkles and breakage in the metal foil 11.

(4) Vibration

It has been found that when the pattern roll 1 and the hard metal roll 2 are mechanically vibrated during forming penetrating pores in the metal foil 11 by high-hardness fine particles 10 of the pattern roll 1, (a) the high-hardness fine particles 10 intrude deep into the metal foil 11, forming large number of penetrating pores with a large average pore size, and (b) burrs generated by the formation of penetrating pores are attached to the plastic sheet laminate 12, so that they tend to be detached from the metal foil 11 when the metal foil 11 is peeled from the plastic sheet laminate 12, resulting in a microporous metal foil with few burrs on the edges of penetrating pores. The mechanical vibration should have at least a component perpendicular to the metal foil 11 (in a penetrating direction of high-hardness fine particles 10 of the pattern roll 1 in the metal foil 11).

Vibration given to the pattern roll 1 and the hard metal roll 2 can be obtained from vibration motors mounted to both bearings of the pattern roll 1 or the hard metal roll 2. Though vibration motors 32, 32 are mounted to both bearings 22, 22 of the hard metal roll 2 in the example shown in FIG. 2, vibration motors may be mounted to both of the pattern roll 1 and the hard metal roll 2. In any case, it is preferable to add mechanical vibration to such an extent as to vigorously vibrate both pattern roll 1 and hard metal roll 2.

Explanations will be made below referring to the example shown in FIG. 2. The vibration motor 32 has a structure of generating vibration by the rotation of an unbalanced weight attached to a rotation shaft of a motor. Accordingly, when the vibration motors 32, 32 are mounted to both bearings 22, 22 of the hard metal roll 2 such that a rotation shaft of each vibration motor 32 is in parallel with the rotation shaft of the hard metal roll 2, generated vibration has a component perpendicular to a gap between the pattern roll 1 and the hard metal roll 2 (in a direction of perpendicularly pressing the high-hardness fine particles 10 of the pattern roll 1 to the metal foil 11). Such vibration motor 32 may be, for example, Uras Vibrator available from Uras Techno Co., Ltd. The vibration frequency may be properly set in a range of 100-2000 Hz.

The above effects (a) and (b) by vibration appear to be obtained due to the fact that when mechanical vibration is given to the high-hardness fine particles 10 of the pattern roll 1 pressed to the metal foil 11, the high-hardness fine particles 10 act as having sharper edges, making easier the cutting of the metal foil 11 by the high-hardness fine particles 10, and the detachment of burrs generated by the formation of penetrating pores from the metal foil 11. To exhibit such functions, the pattern roll 1 and the hard metal roll 2 are preferably vibrated entirely. High-power vibration given to the pattern roll 1 and the hard metal roll 2 cannot be obtained by, for example, ultrasonic vibration, because of insufficient energy.

(5) Peeling of Microporous Metal Foil

The metal foil 11 and the plastic sheet laminate 12 passing through a gap between the pattern roll 1 and the hard metal roll 2 are separated by a guide roll 10$a$ downstream. Because most burrs of the metal foil 11 generated by the formation of sharp penetrating pores under vibration are deep in the soft plastic layer 12$a$ of the plastic sheet laminate 12, most burrs remain in the soft plastic layer 12$a$ of the plastic sheet laminate 12 when the resultant microporous metal foil 11' is peeled from the plastic sheet laminate 12, and most residual burrs are detached from the microporous metal foil 11' by a peeling operation. Thus obtained is a microporous metal foil 11' having large numbers of penetrating pores with substantially no burrs.

[3] Microporous Metal Foil

A microporous metal foil 11' obtained by the present invention has large numbers of penetrating pores having sharp openings. For example, when penetrating pores are formed at a pushing force of 50-600 kgf/cm in a metal foil 11 having a thickness of about 5-50 μm, which is overlapped on a plastic sheet laminate 12 having a thickness of 30-300 μm, using a diamond roll 1 having fine diamond particles 10 having particle sizes of 50-500 μm at an area ratio of 30-80% on the surface, the penetrating pores have pore sizes substantially in a range of 50-400 μm, the number of penetrating pores having pore sizes of 100 μm or more being 500 or more. However, because it is difficult to strictly distinguish dents and penetrating pores formed by high-hardness fine particles 10, the area ratio of penetrating pores in the microporous metal foil 11' is evaluated by light transmittance. The light transmittance (%) is a ratio ($I/I_0 \times 100$) of light $I$ transmitting through the microporous metal foil 11' to incident light $I_0$ having a wavelength of 660 nm. The light transmittance of the microporous metal foil 11' produced by the method of the present invention is generally 0.5-5%, though variable depending on the conditions.

The present invention will be explained in more detail by Examples below, without intention of restriction.

EXAMPLE 1

A pattern roll 1 obtained by attaching fine diamond particles 10 having a particle size distribution of 100-400 μm to a roll of SKD11 having an outer diameter of 200 mm by nickel plating, and a hard roll 2 of SKD11 having an outer diameter of 200 mm were mounted to the apparatus shown in FIG. 2, and vibration motors ("Uras Vibrator" KEE-6-2B available from Uras Techno Co., Ltd.) 32, 32 were mounted to both bearings 22, 22 of the hard roll 2. Each vibration motor 32 had a rotation axis in parallel with that of the hard roll 2. This vibration motor had a structure of generating vibration by the rotation of an eccentric weight, and vibration (perpendicular to a gap of both rolls 1, 2) added to the rotating hard roll 2 had a frequency of 1200 Hz.

A 20-μm-thick aluminum foil 11, and a plastic sheet laminate 12 consisting of a 40-μm-thick polyethylene layer 12$a$ and a 12-μm-thick polyethylene terephthalate layer 12$b$ were caused to pass through a gap between both rotating rolls 1, 2, with the plastic sheet laminate 12 on the side of the hard roll 2, and the polyethylene layer 12$a$ on the side of the aluminum foil 11. Under this condition, penetrating pores were formed in the aluminum foil 11 at a speed of 10 m/minute. A microporous aluminum foil 11' peeled from the plastic sheet laminate 12 was free from defects such as breakage, wrinkles, etc.

Figure 5:
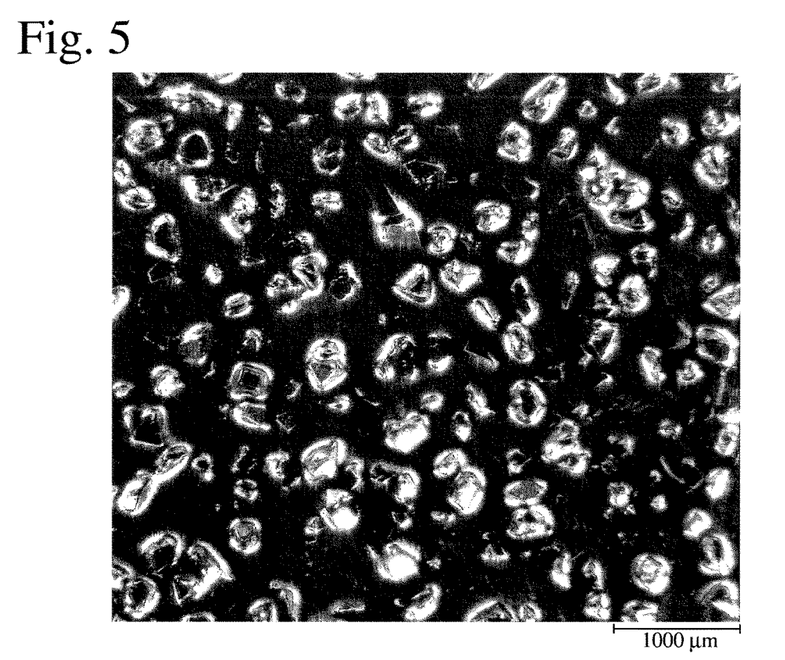
FIG. 5 is an optical photomicrograph (25 times) showing the microporous aluminum foil of Example 1.
Figure 6:
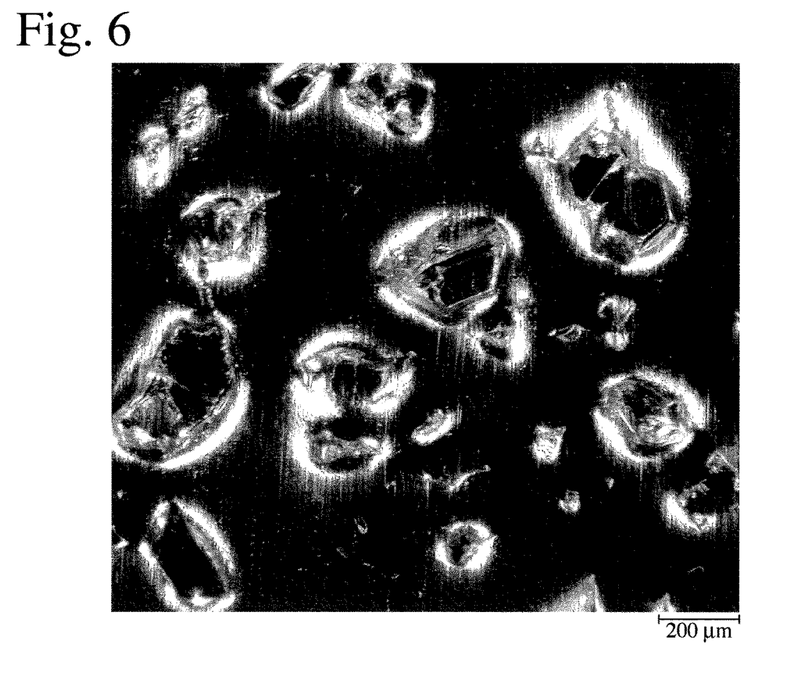
FIG. 6 is an optical photomicrograph (80 times) showing the microporous aluminum foil of Example 1.

The optical photomicrographs (25 times and 80 times) of the microporous aluminum foil 11' of Example 1 are shown in FIGS. 5 and 6, respectively. The observation of the optical photomicrograph of FIG. 5 revealed that penetrating pores had a pore size distribution of substantially 50-400 µm, and that the number of penetrating pores having pore sizes of 100 µm or more was about 600/cm². The observation of the optical photomicrograph of FIG. 6 revealed that penetrating pores had few burrs on the edges. The microporous aluminum foil 11' had light transmittance of 1.0-1.5%. On the other hand, the observation of an optical photomicrograph (80 times) of a surface of the peeled plastic sheet laminate 12 confirmed that a lot of burrs of the aluminum foil 11 remained in the plastic sheet laminate 12. This indicates that the microporous aluminum foil 11' produced in Example 1 had fine penetrating pores having few burrs at high density, without defects such as breakage, wrinkles, etc.

COMPARATIVE EXAMPLE 1

Figure 7:
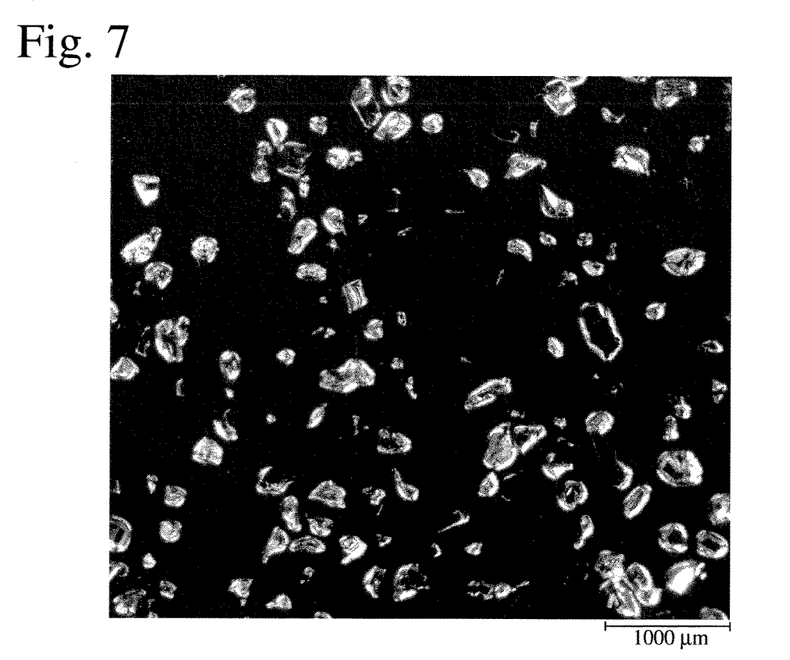
FIG. 7 is an optical photomicrograph (25 times) showing the microporous aluminum foil of Comparative Example 1.
Figure 8:
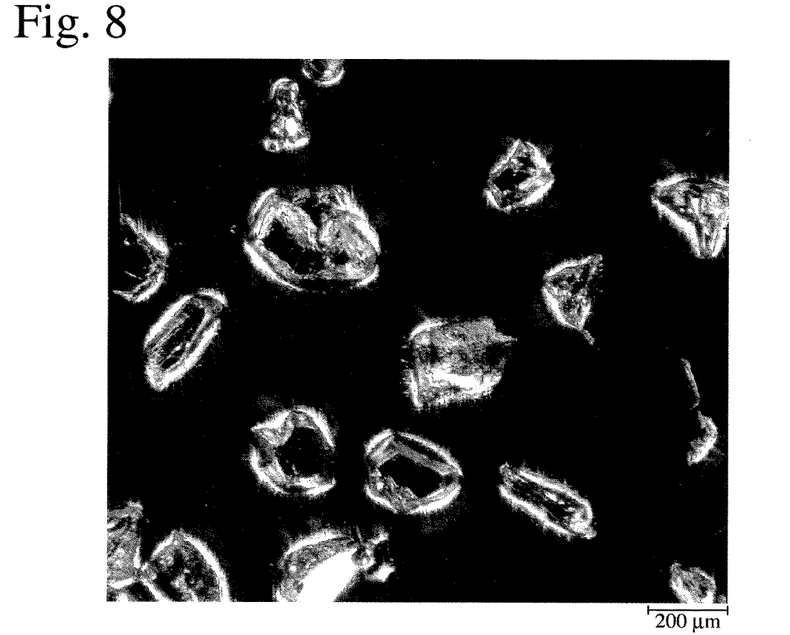
FIG. 8 is an optical photomicrograph (80 times) showing the microporous aluminum foil of Comparative Example 1.

A microporous aluminum foil 11' was produced by the apparatus shown in FIG. 2 in the same manner as in Example 1, except that no vibration was given to the hard roll 2. The optical photomicrographs (25 times and 80 times) of the microporous aluminum foil of Comparative Example 1 11' are shown in FIGS. 7 and 8, respectively. The observation of the optical photomicrograph of FIG. 7 revealed that penetrating pores had a pore size distribution of substantially 50-400 µm, and that the number of penetrating pores having pore sizes of 100 µm or more was about 400/cm². The observation of the optical photomicrograph of FIG. 8 revealed that penetrating pores had relatively large numbers of burrs on the edges. The microporous aluminum foil 11' had light transmittance of 0.3%. It has been found that even though the same apparatus is used, the number of penetrating pores and the light transmittance would be low, with many burrs, if vibration were not applied during the formation of pores.

COMPARATIVE EXAMPLE 2

Figure 9:
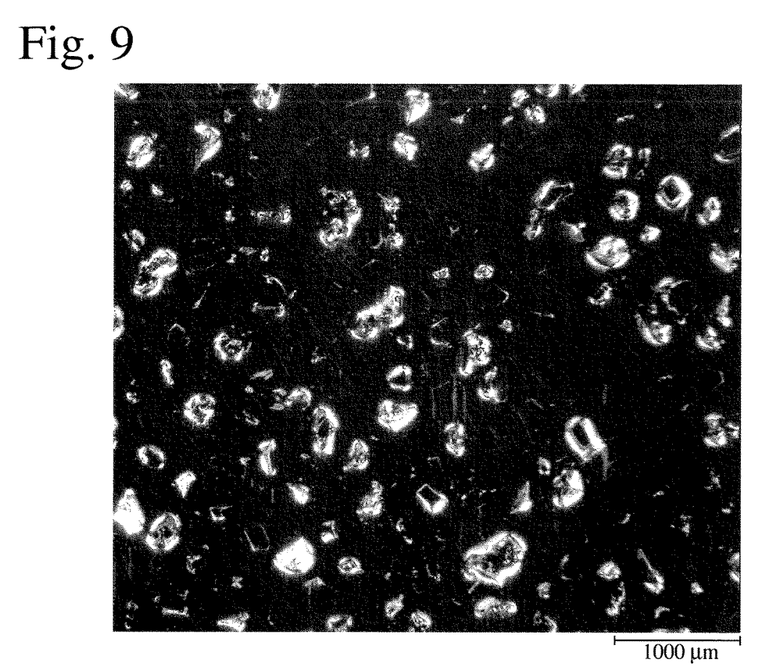
FIG. 9 is an optical photomicrograph (25 times) showing the microporous aluminum foil of Comparative Example 2.
Figure 10:
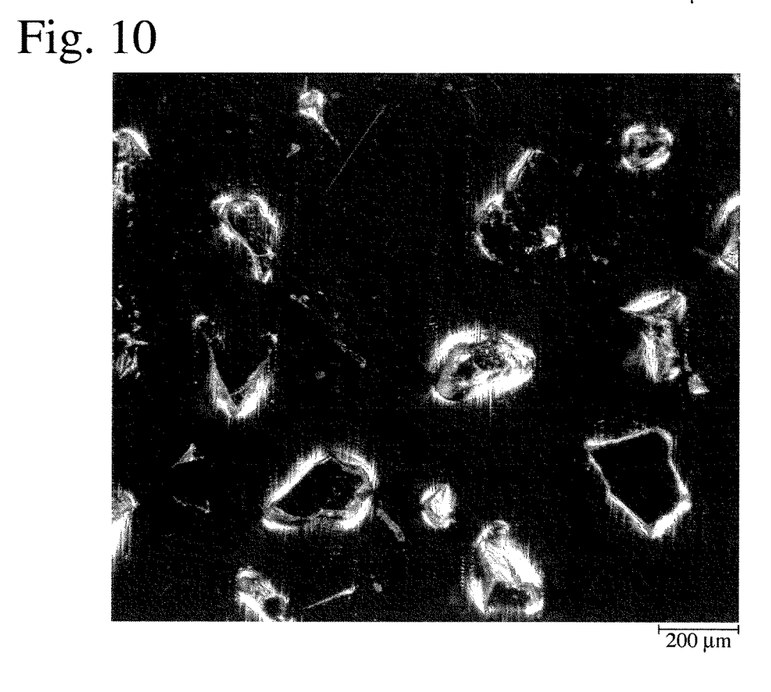
FIG. 10 is an optical photomicrograph (80 times) showing the microporous aluminum foil of Comparative Example 2.

A microporous aluminum foil 11' was produced by the apparatus shown in FIG. 2 in the same manner as in Example 1, except that as the roll 2 opposing the pattern roll 1, a rubber roll was used in place of a hard roll of SKD11, and that no vibration was given. The optical photomicrographs (25 times and 80 times) of the microporous aluminum foil 11' of Comparative Example 2 are shown in FIGS. 9 and 10, respectively. The observation of the optical photomicrograph of FIG. 9 revealed that penetrating pores had a pore size distribution of substantially 50-400 µm, and that the number of penetrating pores having pore sizes of 100 µm or more was about 400/cm². As is clear from FIG. 10, there were a lot of burrs attached to the edges of penetrating pores. This indicates that even though the same apparatus is used, penetrating pores formed by the pattern roll 1 and the rubber roll without adding vibration were few in number and small in size as a whole, with many burrs. As a result, the microporous aluminum foil 11' obtained in Comparative Example 2 had as low light transmittance as 0.1%.

COMPARATIVE EXAMPLE 3

Figure 11:
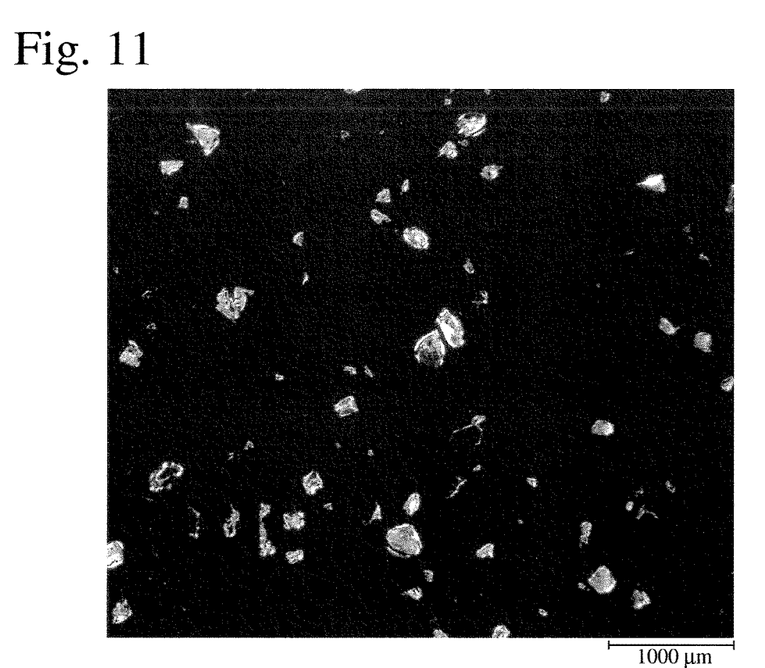
FIG. 11 is an optical photomicrograph (25 times) showing the microporous aluminum foil of Comparative Example 3.
Figure 12:
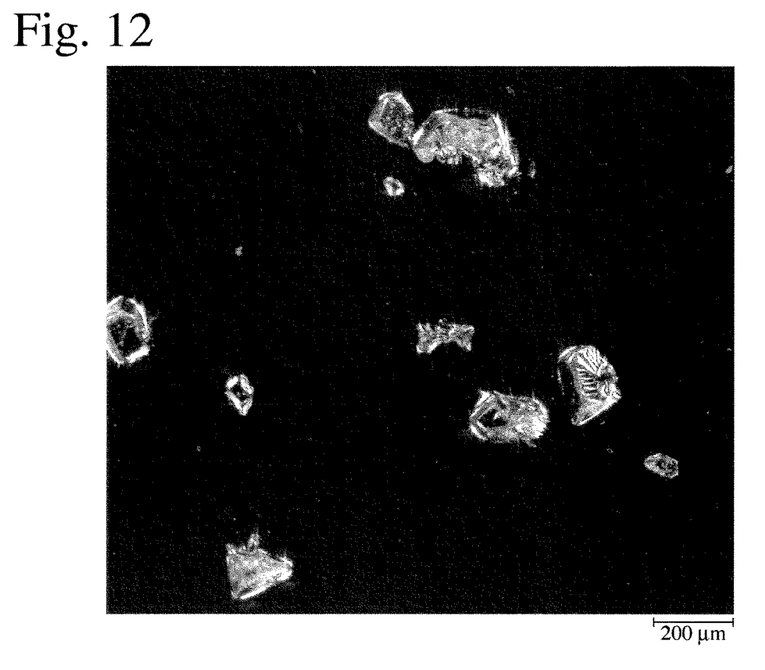
FIG. 12 is an optical photomicrograph (80 times) showing the microporous aluminum foil of Comparative Example 3.

A microporous aluminum foil 11' was produced by the apparatus shown in FIG. 2 in the same manner as in Example 1, except that a plastic sheet laminate 12 was not interposed between the aluminum foil 11 and the hard roll 2, and that no vibration was given to the hard roll 2. The optical photomicrographs (25 times and 80 times) of the microporous aluminum foil 11' of Comparative Example 3 are shown in FIGS. 11 and 12, respectively. The observation of the optical photomicrograph of FIG. 11 revealed that penetrating pores had an extremely small pore size distribution of about 30-200 µm, and that the number of penetrating pores having pore sizes of 50 µm or more was as small as about 240/cm². The microporous aluminum foil 11' had light transmittance of 0.03%. This indicates that even though the same apparatus is used, extremely small penetrating pores would be obtained in smaller number, without an interposing plastic sheet laminate 12 and vibration during the formation of pores, resulting in extremely low light transmittance.

COMPARATIVE EXAMPLE 4

A microporous aluminum foil 11' was tried to produce in the same manner as in Comparative Example 1, except that a plastic sheet 12 consisting only of polyethylene was interposed between the aluminum foil 11 and the hard roll 2. However, the aluminum foil 11 was broken, failing to form a continuous microporous aluminum foil 11'. It may be presumed that the aluminum foil 11 was broken, because the polyethylene sheet 12 was extended by tension during the formation of pores.

With respect to each microporous aluminum foil obtained in Example 1 and Comparative Examples 1-4, the pore size distribution of penetrating pores, the number of penetrating pores having pore sizes of 100 µm or more, and light transmittance are shown in Table 1.

TABLE 1

| No. | Pore Size Distribution (µm) | Number (/cm²) | Light Transmittance (%) |
|---|---|---|---|
| Example 1 | 50-400 | 600 | 1.0-1.5 |
| Com. Ex. 1 | 50-400 | 400 | 0.3 |
| Com. Ex. 2 | 50-400 | 400 | 0.1 |
| Com. Ex. 3 | 30-200 | 240[(1)] | 0.03 |
| Com. Ex. 4[(2)] | — | — | — |

Note:
[(1)]The number of penetrating pores having pore sizes of 50 µm or more.
[(2)]Not measured, because the aluminum foil was broken.

EXAMPLES 2-4

Figure 13:
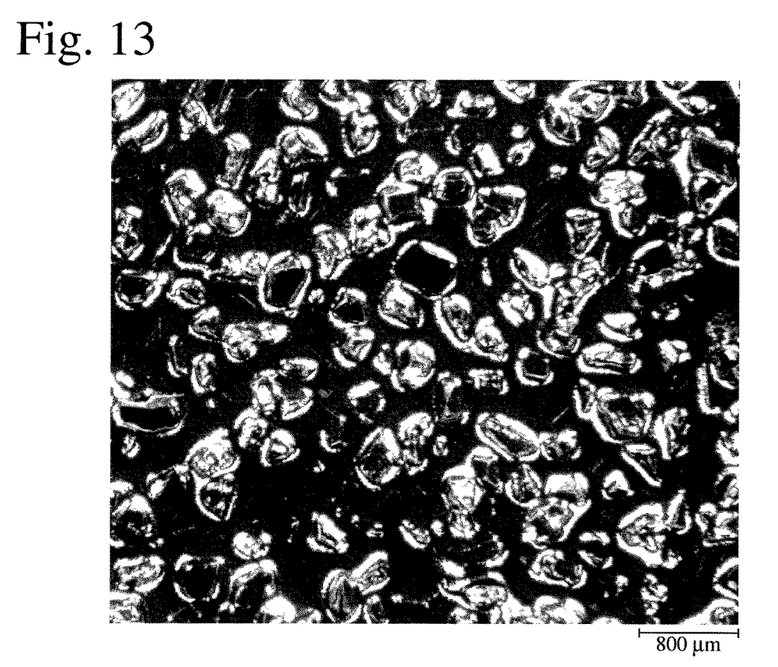
FIG. 13 is an optical photomicrograph (25 times) showing the microporous copper foil of Example 2.
Figure 14:
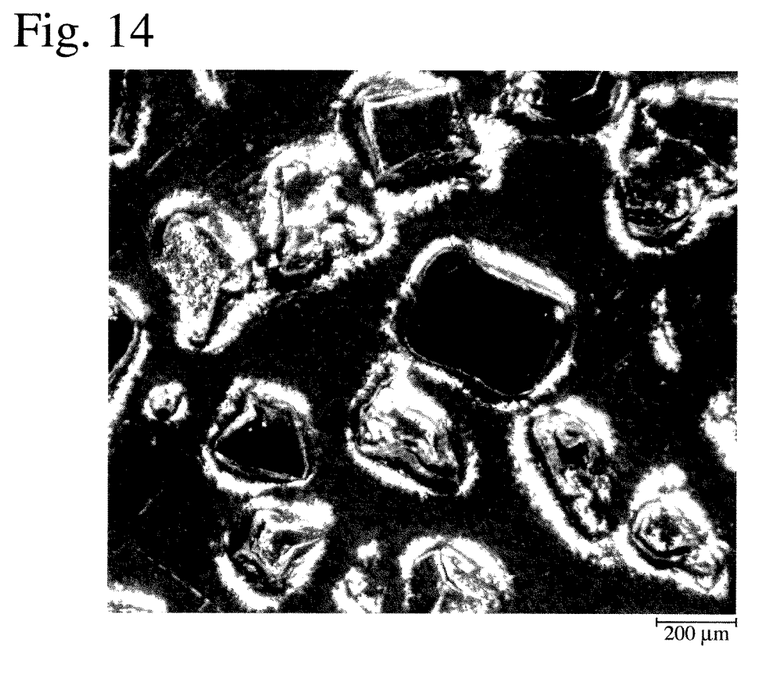
FIG. 14 is an optical photomicrograph (80 times) showing the microporous copper foil of Example 2.

A 12-µm-thick copper foil 11 and a plastic sheet laminate 12 shown in Table 2 were caused to pass through a gap between both rolls 1, 2 in the same apparatus as in Example 1, with the plastic sheet laminate 12 on the side of the hard roll 2, and the soft plastic layer 12a on the side of the copper foil 11. Penetrating pores were formed in the copper foil 11 under the same conditions as in Example 1, except that vibration having a frequency of 1200 Hz was applied to the rotating hard roll 2. Fine penetrating pores with few burrs were formed in the resultant microporous copper foil 11' at high density, without defects such as breakage, wrinkles, etc. The optical photomicrographs (25 times and 80 times) of the microporous copper foil 11' of Example 2 are shown in FIGS. 13 and 14, respectively. In each Example, the observation of an optical photomicrograph (80 times) confirmed that large numbers of copper foil burrs were attached to the used soft plastic layer 12a. With respect to each microporous copper foil 11', the pore size distribution of penetrating pores, the number of penetrating pores having pore sizes of 100 μm or more, and light transmittance were measured under the same conditions as in Example 1. The results are shown in Table 3.

TABLE 2

| | Plastic Sheet Laminate[1] | | | |
|---|---|---|---|---|
| | Soft Plastic Layer | | Hard Plastic Layer | |
| No. | Type | Thickness (μm) | Type | Thickness (μm) |
| Example 2 | LDPE[2] | 40 | OPP[4] | 20 |
| Example 3 | CPP[3] | 40 | PET[5] | 12 |
| Example 4 | CPP | 30 | Ny[6] | 15 |

Note:
[1]Having a 20-μm-thick adhesion layer between a soft plastic layer and a hard plastic layer.
[2]LDPE represents low-density polyethylene [Lix (registered trademark) available from Toyobo Co., Ltd.].
[3]CPP represents unoriented polypropylene [Pylen (registered trademark) P1128 available from Toyobo Co., Ltd.].
[4]OPP represents biaxially oriented polypropylene [Pylen (registered trademark) P2161 available from Toyobo Co., Ltd.].
[5]PET represents polyethylene terephthalate [Toyobo Ester (registered trademark) E5100 available from Toyobo Co., Ltd.].
[6]Ny represents nylon [Harden (registered trademark) N1100 available from Toyobo Co., Ltd.].

COMPARATIVE EXAMPLE 5

A microporous copper foil 11' was produced in the same manner as in Example 2 except for adding no vibration, to measure the pore size distribution of penetrating pores, the number of penetrating pores having pore sizes of 100 jam or more, and light transmittance. The results are shown in Table 3. In the microporous copper foil 11' of Comparative Example 5, there were relatively many burrs remaining on the edges of penetrating pores.

COMPARATIVE EXAMPLE 6

A microporous copper foil 11' was produced in the same manner as in Example 2 except for using no plastic sheet laminate 12 and adding no vibration, to measure the pore size distribution of penetrating pores, the number of penetrating pores having pore sizes of 100 μm or more, and light transmittance. The results are shown in Table 3. In the microporous copper foil 11' of Comparative Example 5, there were many burrs remaining on the edges of penetrating pores.

TABLE 3

| | Penetrating Pores | | Light |
|---|---|---|---|
| No. | Pore Size Distribution (μm) | Number (/cm²)[1] | Transmittance (%) |
| Example 2 | 100-300 | 600 | 1.3-1.5 |
| Example 3 | 100-300 | 600 | 1.3-1.5 |
| Example 4 | 100-300 | 600 | 1.3-1.5 |
| Com. Ex. 5 | 100-150 | 400 | 0.05-0.1 |
| Com. Ex. 6 | 100-150 | 200 | 0.1-0.03 |

Note:
[1]The number of penetrating pores having pore sizes of 100 μm or more.

The results of Examples 2-4 and Comparative Examples 5 and 6 indicate that (a) when a plastic sheet laminate 12 comprising a soft plastic layer 12a and a hard plastic layer 12b is interposed between a copper foil 11 and a hard roll 2, with the soft plastic layer 12a on the side of the copper foil 11, penetrating pores having relatively large pore sizes with few burrs can be formed in the copper foil 11 at high density; and that (b) when the thickness of the soft plastic layer 12a is 30 μm or more, pores are easily formed in the copper foil 11.

REFERENCE EXAMPLE 1

Both surfaces of the microporous aluminum foil 11' of Example 1 were coated with a positive electrode material for a lithium ion battery, dried at 120° C., and roll-pressed. The positive electrode material had a composition comprising 100 parts by weight of lithium nickel cobalt manganese oxide (NCM) as an active material, 3 parts by weight of acetylene black (HS-100 available from Denki Kagaku Kogyo Kabushiki Kaisha) as a conductive additive 1, 3 parts by weight of graphite powder (KS6L available from Timcal Graphite and Carbon) as a conductive additive 2, 3 parts by weight of polyvinylidene fluoride (PVDF) as a binder, and 61 parts by weight of N-methyl-2-pyrrolidone as a solvent. Microscopic observation confirmed that penetrating pores were filled with the positive electrode material. This indicates that microporous aluminum foils obtained by the present invention are suitable for current collectors in lithium ion batteries.

DESCRIPTION OF REFERENCE NUMERALS

1: Pattern roll
2: Hard metal roll
10: High-hardness fine particle
11: Metal foil
11': Microporous metal foil
12: Plastic sheet laminate
12a: Soft plastic layer
12b: Hard plastic layer
14: Plating layer
21, 22, 27, 28: Bearing
30: Frame
32: Vibration motor
34, 36: Driving means

What is claimed is:

1. A method for producing a microporous metal foil comprising forming fine penetrating pores having pore sizes in a range of 50-400 μm in a metal foil passing through a gap between a pattern roll having high-hardness fine particles having Mohs hardness of 5 or more on the surface and a hard metal roll;
   (a) a plastic sheet laminate comprising a soft plastic layer and a hard plastic layer having high tensile strength being interposed between said metal foil and said hard metal roll, with said soft plastic layer on the metal foil side;
   (b) said high-hardness fine particles having particle sizes of 50-500 μm;
   (c) said soft plastic layer having a thickness of 20-300 μm, and said hard plastic layer having a thickness of 10-30 μm to impart sufficient tensile strength to said plastic sheet laminate;
   (d) substantially equal tension being applied to said metal foil and said plastic sheet laminate; and
   (e) mechanical vibration being given to at least one of said pattern roll and said hard metal roll.

2. The method for producing a microporous metal foil according to claim 1, wherein a pushing force of said pattern roll to said metal foil is 50-600 kgf/cm by linear pressure.

3. The method for producing a microporous metal foil according to claim 1, wherein said mechanical vibration has a component perpendicular to said metal foil.

4. The method for producing a microporous metal foil according to claim 1, wherein said mechanical vibration is given by a vibration motor mounted to each bearing of said pattern roll or said hard metal roll.

5. The method for producing a microporous metal foil according to claim 4, wherein the frequency of said mechanical vibration is 500-2000 Hz.

6. The method for producing a microporous metal foil according to claim 1, wherein an area ratio of said fine particles is 30-80% on a roll surface.

7. An apparatus for producing a microporous metal foil, comprising
- a pore-forming apparatus comprising a pattern roll having large numbers of high-hardness fine particles having Mohs hardness of 5 or more and particle sizes of 50-500 µm on the surface, and a hard roll opposing said pattern roll with a gap;
- a first guide means for passing a metal foil through the gap between said pattern roll and said hard roll;
- a second guide means for passing a plastic sheet laminate comprising a soft plastic layer and a hard plastic layer having high tensile strength, through the gap between said metal foil and said hard roll;
- pluralities of movable guide rolls whose positions are changed to apply equal tension to said metal foil and said plastic sheet laminate; and
- a vibration means for giving mechanical vibration to at least one of said pattern roll and said hard roll;

said soft plastic layer having a thickness of 20-300 µm, and said hard plastic layer having a thickness of 10-30 µm to impart sufficient tensile strength to said plastic sheet laminate; and said metal foil and said plastic sheet laminate being overlapped such that said metal foil, said soft plastic layer and said hard plastic layer are arranged in this order from the pattern roll side, and passing through a gap between said pattern roll and said hard roll under mechanical vibration, thereby forming fine penetrating pores having pore sizes in a range of 50-400 µm in said metal foil.

8. The apparatus for producing a microporous metal foil according to claim 7, wherein a pushing force of said pattern roll to said metal foil is 50-600 kgf/cm by linear pressure.

9. The apparatus for producing a microporous metal foil according to claim 7, wherein said mechanical vibration has a component perpendicular to said metal foil.

10. The apparatus for producing a microporous metal foil according to claim 7, wherein said mechanical vibration is given by a vibration motor mounted to each bearing of said pattern roll or said hard metal roll.

11. The apparatus for producing a microporous metal foil according to claim 10, wherein the frequency of said mechanical vibration is 500-2000 Hz.

12. The apparatus for producing a microporous metal foil according to claim 7, wherein an area ratio of said fine particles is 30-80% on a roll surface.

* * * * *